United States Patent [19]
Jabr et al.

[11] Patent Number: 5,887,091
[45] Date of Patent: Mar. 23, 1999

[54] BIDIRECTIONAL OPTICAL AMPLIFIER HAVING FLAT GAIN

[75] Inventors: Salim N. Jabr, Mountain View; Gennady I. Farber, Palo Alto; Edward A. Vetter, Santa Clara; Sami T. Hendow, Sunnyvale, all of Calif.

[73] Assignee: Ditech Corporation, Sunnyvale, Calif.

[21] Appl. No.: 896,930

[22] Filed: Jul. 18, 1997

[51] Int. Cl.[6] .................................................. G02N 6/28
[52] U.S. Cl. ............................................................ 385/24
[58] Field of Search ................................................ 385/24

[56] References Cited

U.S. PATENT DOCUMENTS

| | | |
|---|---|---|
| 5,039,199 | 8/1991 | Mollenauer et al. ...................... 385/31 |
| 5,050,949 | 9/1991 | DiGiovanni et al. ..................... 359/341 |
| 5,557,442 | 9/1996 | Huber ....................................... 359/179 |
| 5,563,733 | 10/1996 | Mitsuda et al. .......................... 359/341 |
| 5,604,627 | 2/1997 | Kohn ........................................ 359/341 |
| 5,633,741 | 5/1997 | Giles ........................................ 359/124 |

*Primary Examiner*—Akm E. Ullah
*Attorney, Agent, or Firm*—Douglas J. Crisman; Flehr Hohbach Test Albritton & Herbert LLP

[57] ABSTRACT

A bidirectionally amplifying rare earth doped fiber optical amplifier having an equalized gain at multiple wavelengths is disclosed for use in dense wavelength multiplexed bidirectional fiber transmission applications. In a first embodiment, a four port circulator is utilized with two amplifying fibers; one for each direction of propagation and a multiplicity of gratings configured to equalize the gain at the different wavelengths. Different embodiments utilizing three port and four port circulators are utilized. A more general amplifier device with equal gain at multiple wavelengths is disclosed.

12 Claims, 10 Drawing Sheets

BIDIRECTIONAL OPTICAL AMPLIFIER HAVING FLAT GAIN

This invention pertains to fiber communication systems and more particularly to the transmission and amplification of several multiplexed wavelengths on fiber carrying light simultaneously in two directions of propagation.

BACKGROUND OF THE INVENTION

The introduction in recent years of optical amplifiers with wide wavelength operating range in the 1520 to 1580 nm spectral region into fiber communication systems has enabled the practice of dense wavelength division multiplexing (DWDM). In DWDM systems a group of sixteen or even as many as sixty four wavelengths are simultaneously transmitted in a fiber, each wavelength being modulated by a data stream as fast as 10 Gb/s. Such high capacity communication systems consist of optical transmitters, cabled fiber, optical amplifiers, wavelength multiplexers and optical receivers and need to be closely monitored to detect any malfunction that may corrupt the information transmission. The bit error rate (BER) is a measure defined as the number of errored bits divided by the total number of bits received in a given time period. BER is sensitive to several parameters of the transmission system such as the optical power at the receiver, the quality of the transmitter, but particularly to the ratio of signal power to noise power, known as the signal to noise ratio (SNR) at the receiver. In turn the SNR is determined by the addition of receiver thermal noise shot noise and noise added by optical amplifiers in the system.

One of the most important parameters of optical amplifiers is the gain at the various wavelengths. For proper operation the receivers operating at the various wavelengths expect a common and substantially equal optical signal to noise ratio as well as substantially equal optical power. Since transmitters generally output substantially equal amounts of power at various wavelengths, the amplifiers in the system are expected to provide equal gain at the various channel wavelengths.

Several methods of equalizing or flattening the gain of optical amplifiers have been explored in the literature. The book titled "Erbium Doped Optical Amplifiers" by Emmanuel Desurvire discusses such gain flattening techniques on page 480. The article "Flat-gain amplifiers and transmission in WDM networks", paper FA1-1 presented at the "Optical amplifiers and their applications" conference by Bertrand Clesca also compares gain flattening techniques. In Erbium doped fibers the gain at any given wavelength has contributions from several broadened atomic resonances. Each of these resonances is centered at a slightly different wavelength in the 1520 to 1580 nm range and originates from a different pair of Stark sublevels in Erbium. The material of the glass matrix containing the Erbium as well as dopants in that matrix, affect the position and broadening of the atomic resonances in Erbium. One of the known techniques for flattening the gain curve is the use of aluminum co-doping of Erbium doped fiber. Another technique utilizes fluoride glass instead of silica glass as the fiber material. Yet other techniques insert specially shaped spectral filters in line with the amplifiers to compensate for the difference in gain at different wavelengths. U.S. Pat. No. 5,050,949 by Di Giovanni and Giles, describes the use of two stage fiber amplifiers to achieve flattened gain. The drawback of the two stage approach is that it still lacks enough suppression of the gain in the 1520 to 1535 nm spectral region to achieve the desired degree of flatness.

More recently, U.S. Pat. No. 5,557,442 by Huber describes a technique involving the use of a circulator, a series of fiber Bragg reflectors imprinted into a fiber and a set of attenuators to achieve gain flattening. Circulators are optical devices with three or more fiber ports that channel the light from port I into port I+1, Bragg gratings are periodic index of refraction gratings imprinted into the fiber core by UV light and reflect fiber propagating light at specific wavelengths matching the periodicity of the gratings. In U.S. Pat. No. 5,557,442 the light enters the amplifier then the circulator and is channeled into the chain of Bragg reflectors and attenuators. The light at a first wavelength W1 which experiences little gain in the amplifier is reflected from the first Bragg grating and thus suffers no attenuation before returning to the circulator and being channeled out. Light at a second wavelength W2 which experiences somewhat higher gain than W1 is reflected by a subsequent Bragg grating thus having to go through one or more attenuators before it returns to the circulator and gets channeled out. Light at a wavelength W3 experiencing the highest gain in the amplifier is reflected back by the last Bragg grating in the fiber thus forcing it to go through the whole attenuator chain twice before it reaches the circulator and gets channeled out.

Several drawbacks of U.S. Pat. No. 5,557,442 are apparent. The multitude of attenuators required adds to the cost of the device and to the complexity of its construction since such attenuators are generally bulk optical devices which include lenses and involve stringent alignment requirements in manufacturing. Furthermore such attenuators may exhibit temperature dependence and are required to be spliced between the Bragg gratings one at a time. Finally the Huber device allows unidirectional operation only.

Recently it has become generally accepted that optical amplifiers allowing bidirectional transmission in WDM networks offer several advantages. The advantages of bidirectional amplifiers and a specific embodiment of a bidirectional amplifier are described in U.S. Pat. No. 5,633,741 by Giles. Giles teaches the use of two four-port circulators in conjunction with fiber gratings to achieve a bidirectional amplifier.

A generally useful device in fiber optics whose function is to transfer or channel light from one fiber to the next fiber in an ordered set of fibers is known as the circulator. For example a circulator device will channel light from the first fiber in a set to the second fiber and from the second fiber to the third. The point of connection between a fiber and the circulator is referred to as a port and generally the ports are numbered to indicate their ordering. Circulators with three and four ports are commercially available from companies such as Etek of San Jose, Calif. and The Kaifa Group of Sunnyvale, Calif.

Referring to FIG. 1, light at frequencies f2 and f4 enters the first port P1 of the first circulator C1 and is channeled to the second port P2 where it enters a fiber with Bragg gratings G2 configured to reflect at f2 and f4 back into the circulator C1 and out to the third port P3 which is connected to the amplifier A1. The output of the amplifier A1 is then fed to the fourth port P4 of a second circulator C2 and from there f2 and f4 exit through the first port P1 of the second circulator C2. The wavelengths or frequencies f1 and f3 propagating in opposition to f2 and f4 are input through the first port P1 of the second circulator C2 and follow a similar if reverse path to f2 and f4. Other types of bidirectional amplifiers have been described as in U.S. Pat. No. 5,604,627 to Kohn where two wavelength division multiplexing devices (WDM) are utilized in place of the circulators to separate the counter-propagating light streams.

The drawback of the devices shown in the prior art is their failure to provide flat gain profiles especially in the 1533 nm spectral range as well as bidirectional operation. It is therefore a first objective of this invention to provide an erbium doped amplifier with a flat gain profile which is capable of bidirectional operation.

Another objective of this invention is to simplify the construction of the amplifier and to reduce the cost of its manufacturing.

A third objective is to eliminate the use of attenuators and their temperature dependence in either unidirectional or bidirectional amplifiers.

A fourth objective is to reduce the number of circulators and circulator ports used.

A fifth objective is to eliminate the need for fiber couplers or wavelength routers required in the prior art to couple the pump and signal lights into the doped fiber.

It is a further objective of this invention to remedy the general drawbacks described in the background section.

SUMMARY OF THE INVENTION

In a fiber optical communication system, a doped fiber amplifier comprising a four port circulator with a first fiber port connected to an input fiber, a second port connected to an output fiber, a third port connected to a first rare earth doped amplifying fiber, the amplifying fiber having a multiplicity of fiber gratings written into its core to reflect specific light wavelengths, and a pump laser being connected to the end of the amplifying fiber to provide pump power to the rare earth dopant, a similar second amplifying fiber with a second set of gratings made to reflect at a second set of wavelengths is connected to the fourth port of the circulator. Light at a first set of wavelengths enters the input fiber and is channeled to the gain fiber with the gratings arranged in such a manner that the wavelengths experiencing the most gain in the non uniform gain of the fiber are reflected from the gratings nearest the circulator and thus travel a shorter distance in the gain fiber as they are reflected back to the circulator and channeled out to the output fiber. In this manner the gains or amplifications experienced by all wavelengths in the first set of wavelengths can be made equal. Light at a second set of wavelengths enters the circulator through the output fiber and is channeled to the second gain fiber where the similar arrangement of gratings reflects the light back to the circulator and out to the input fiber, thus providing the second set of wavelengths with an amplifying path counter directional to the first set of wavelengths. The four port circulator can be made from two three port circulators properly interconnected.

BRIEF DESCRIPTION OF THE DRAWINGS

Additional objects and features of the invention will be more readily apparent from the following detailed description and appended claims when taken in conjunction with the drawings, in which:

DESCRIPTION OF THE PREFERRED EMBODIMENT

Figure 1:
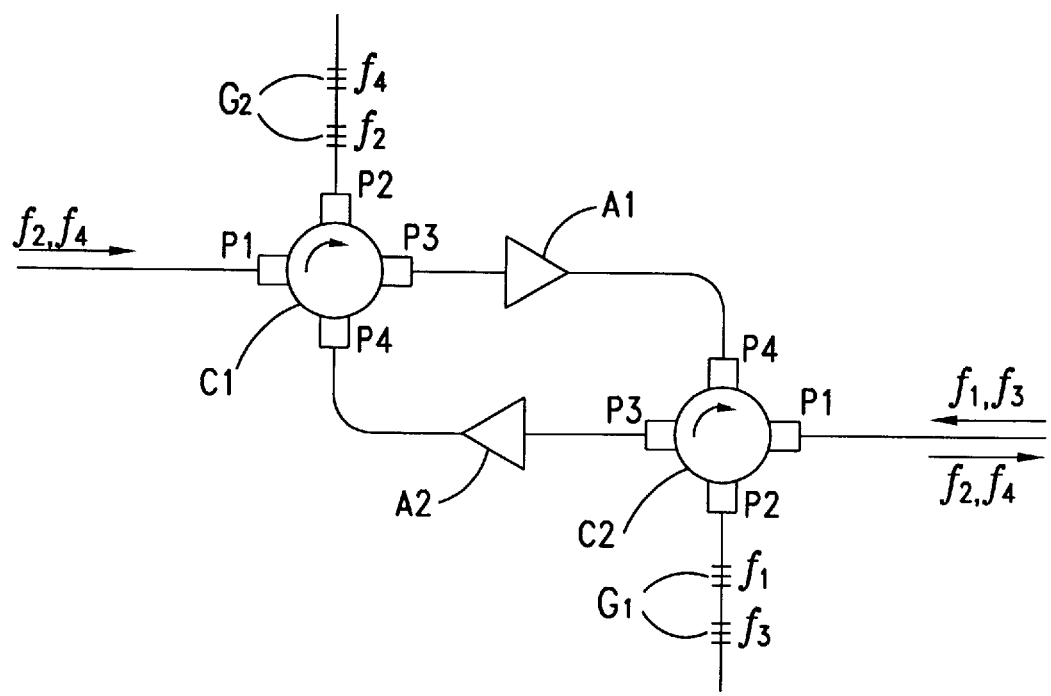
FIG. 1 is a description of a prior art bidirectional amplifier.
Figure 2A:
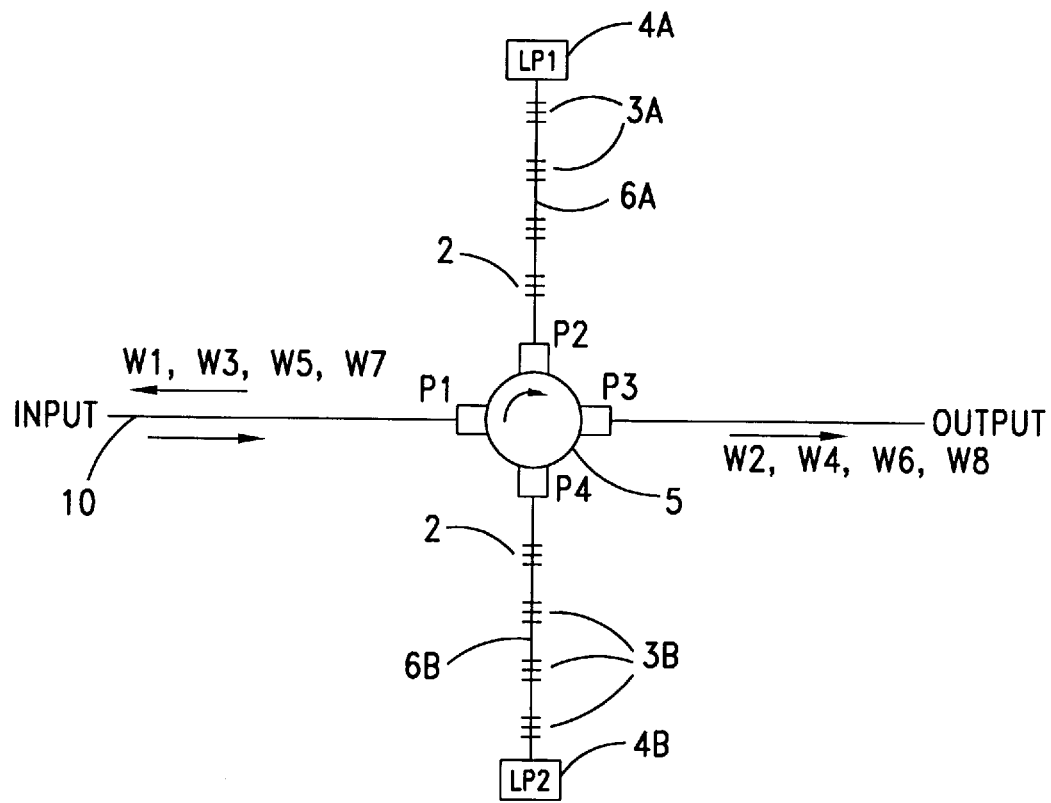
FIG. 2A is a schematic showing the preferred embodiment of the present invention.

Referring to FIG. 2A, there is shown a schematic of the preferred embodiment of the present inventive fiber amplifier comprising an input fiber 10 connected to a first port P1 of a four port optical circulator 5, an output fiber 12 connected to the third port P3 of the circulator 5, a first amplifying fiber 6A, the first end of the amplifying fiber 6 being connected to the second port P2 of the circulator 5 and the second end of the amplifying fiber 6 being connected to a pump laser 4A, a second amplifying fiber 6B, the first end of this second amplifying fiber 6B being connected to the fourth port P4 of the circulator 5 and the second end of the second fiber 6B being connected to a second pump laser 4B. Within the core of the amplifying fiber 6A a multiplicity of gratings 3A is written using methods well known in the art such as the exposure to two interfering beams of ultraviolet radiation. Within the core of the amplifying fiber 6B, a multiplicity of gratings 3B is written. The spatial periods of gratings 3A are made such that each of the gratings 3A in the first amplifying fiber 6A reflects at a wavelength Wi from a first multiplicity of wavelengths. The spatial periods of gratings 3B are made such that each of the gratings 3B in the second amplifying fiber 6B reflects at a wavelength Wj from a second distinct multiplicity of wavelengths.

The ordering of the gratings starting from the fiber end closest to the circulator, and the reflectivity of the gratings 3A and 3B is chosen in a specific manner described hereafter. The fiber segment lengths between the individual gratings 3A and between the gratings 3B is also chosen in a specific manner. It is well known that the amplification experienced by light propagating in a pumped rare earth doped fiber varies depending on the wavelength. Let Gi be the gain experienced by light at wavelength Wi after propagating a length Di in the fiber starting at the circulator 5, being reflected by a grating with reflectivity Ri positioned at a fiber length Di from the circulator and propagating back to the circulator. The length Di is chosen so that the product GiRi is the same for all wavelengths in the amplifier operating range. Taking the specific example of three wavelengths W1, W2, W3 with corresponding gain coefficients per unit length g1, g2, g3 such that g3 is larger than g2 and g2 larger than g1. It is clear that the lengths D1, D2, D3 are to be chosen such that D3 is smaller than D2 and D2 smaller than D1 so that the gains G1, G2, G3 come out equal. This result determines the ordering of the gratings 3 at wavelengths W1, W2, W3.

The reflectivities of the gratings 3 can also be varied by increasing or decreasing the UV exposure when writing the gratings into the fiber. Varying the reflectivities or varying the ordering of the gratings may each be sufficient to provide equal amplification at all wavelengths, however it may be more convenient to vary both the ordering, the lengths Di as well as the reflectivities Ri to achieve equal amplification.

Figure 2B:
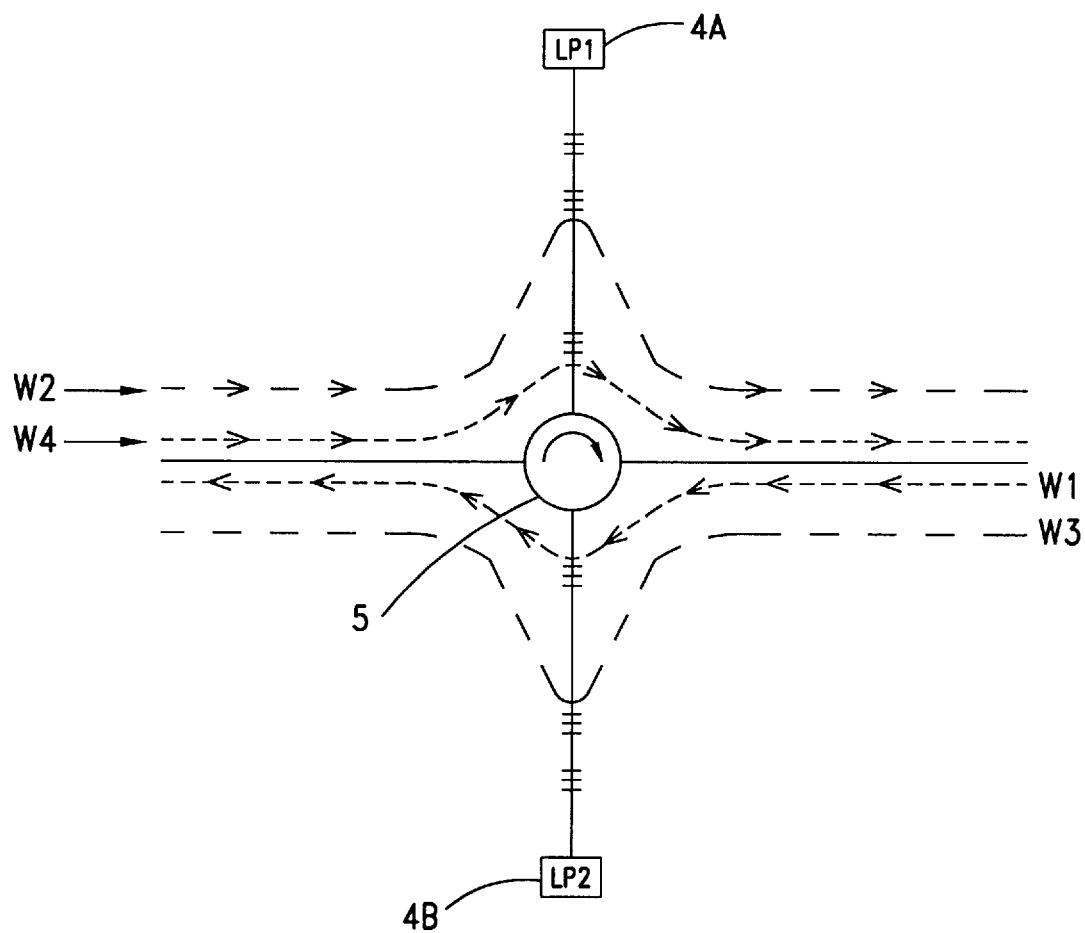
FIG. 2B is a flow diagram showing the light paths of the counter-propagating light beams.

Referring to FIG. 2B there is shown in dashed lines the paths of two light beams at wavelengths W1 and W3 propagating in the right to left direction and two other light beams at wavelengths W2 and W4 propagating in the left to right direction.

Figure 3:
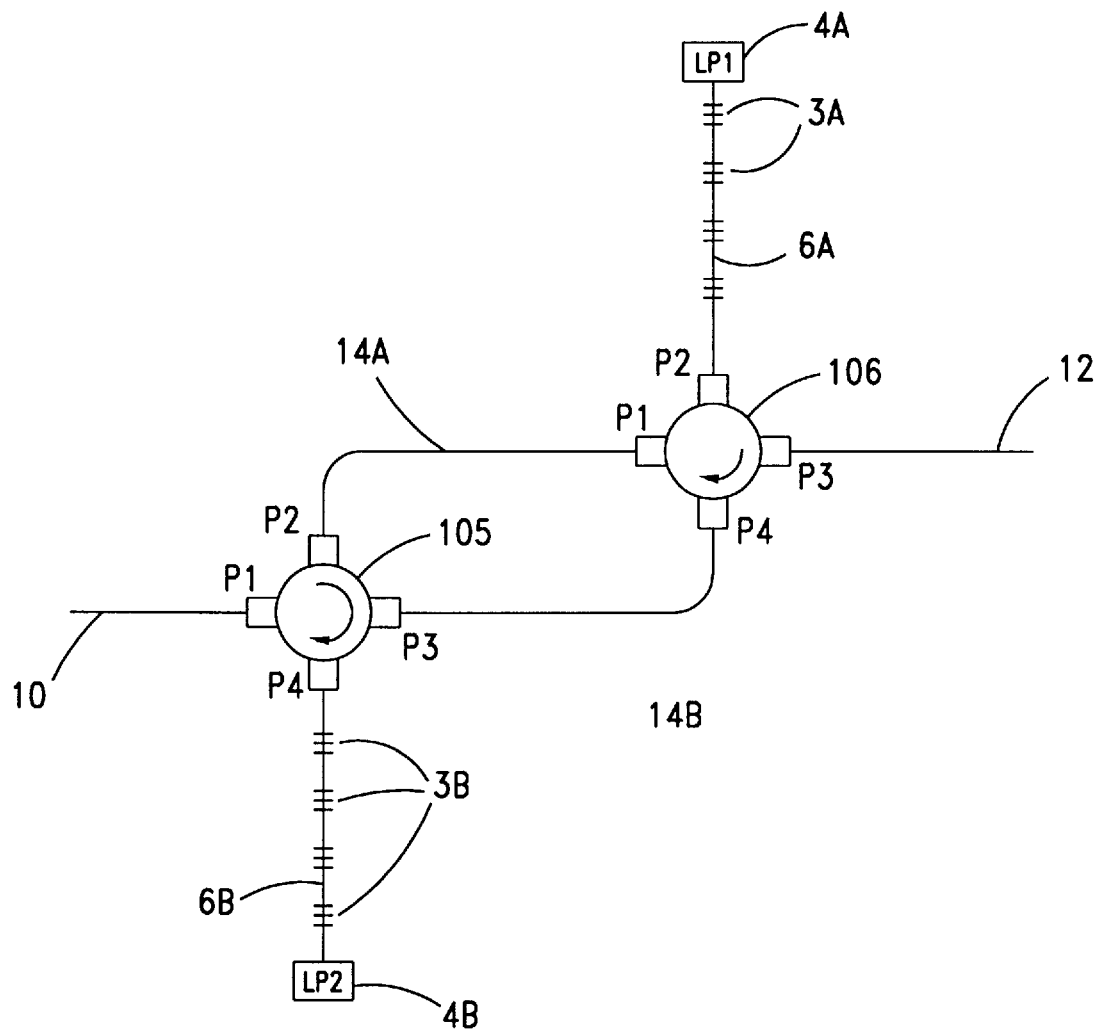
FIG. 3 is a more detailed description of the preferred embodiment.

Referring now to FIG. 3 there is shown the schematic of a particular embodiment wherein the first port of circulator 106 and second port of circulator 105 are connected via fiber 14A. As described above the light at a first set of wavelengths enters the amplifier through the input fiber 10 and is channeled to the amplifying fiber 6A by the circulators 105 and 106 then reflected back, one wavelength from each corresponding grating 3A, into the circulator 106 then back out to fiber 12.

The light at a second set of wavelengths enters from the output fiber 12 in a direction counter-propagating to the first set of wavelengths, is channeled to the second amplifying fiber 6B by the circulators 106 and 105, reflected back to the circulator 105 by the set of gratings 3B and out to fiber 12. Pump laser 4A is connected to the distal end of the amplifying fiber 6A as in the first embodiment. Pump laser 4B is connected to the distal end of the amplifying fiber 6B as in the first embodiment.

Figure 4A:
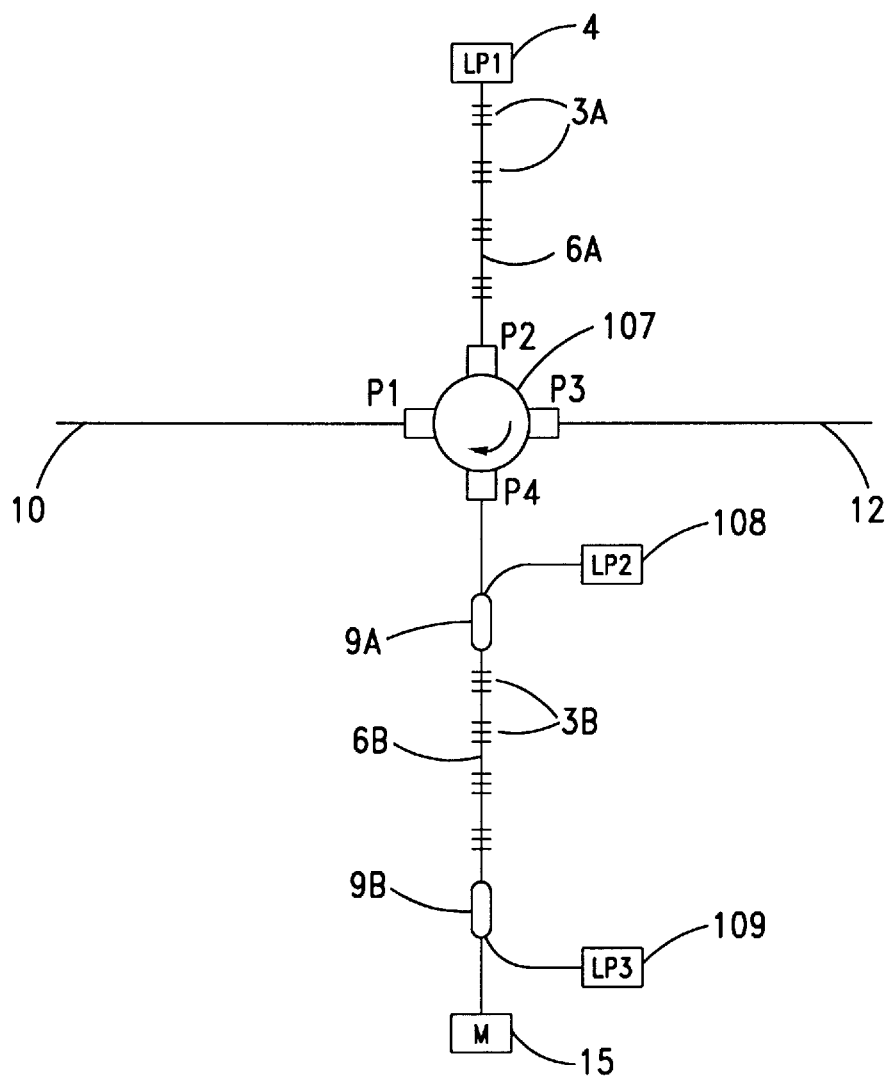
FIG. 4A is a schematic showing an alternative embodiment of the present invention.

In a different embodiment shown in FIG. 4A, the coupling of the pump light from the pump lasers 108 and 109 into the amplifying fiber 6B is done by utilizing wavelength sensitive couplers 9A and 9B thus enabling the choice of pumping the amplifier from either the proximal or the distal end relative to the circulator 107, or alternatively to pump simultaneously from both ends of the fiber 6B in order to increase the pump power available to the amplifier. The couplers 9A and 9B available commercially from manufacturers such as Gould Inc. of New Jersey usually have three or four fiber ports. At least one of the ports of the couplers 9A and 9B may be utilized to monitor the light passing through the amplifying fiber 6B by means of a photodetector 15.

Figure 4B:
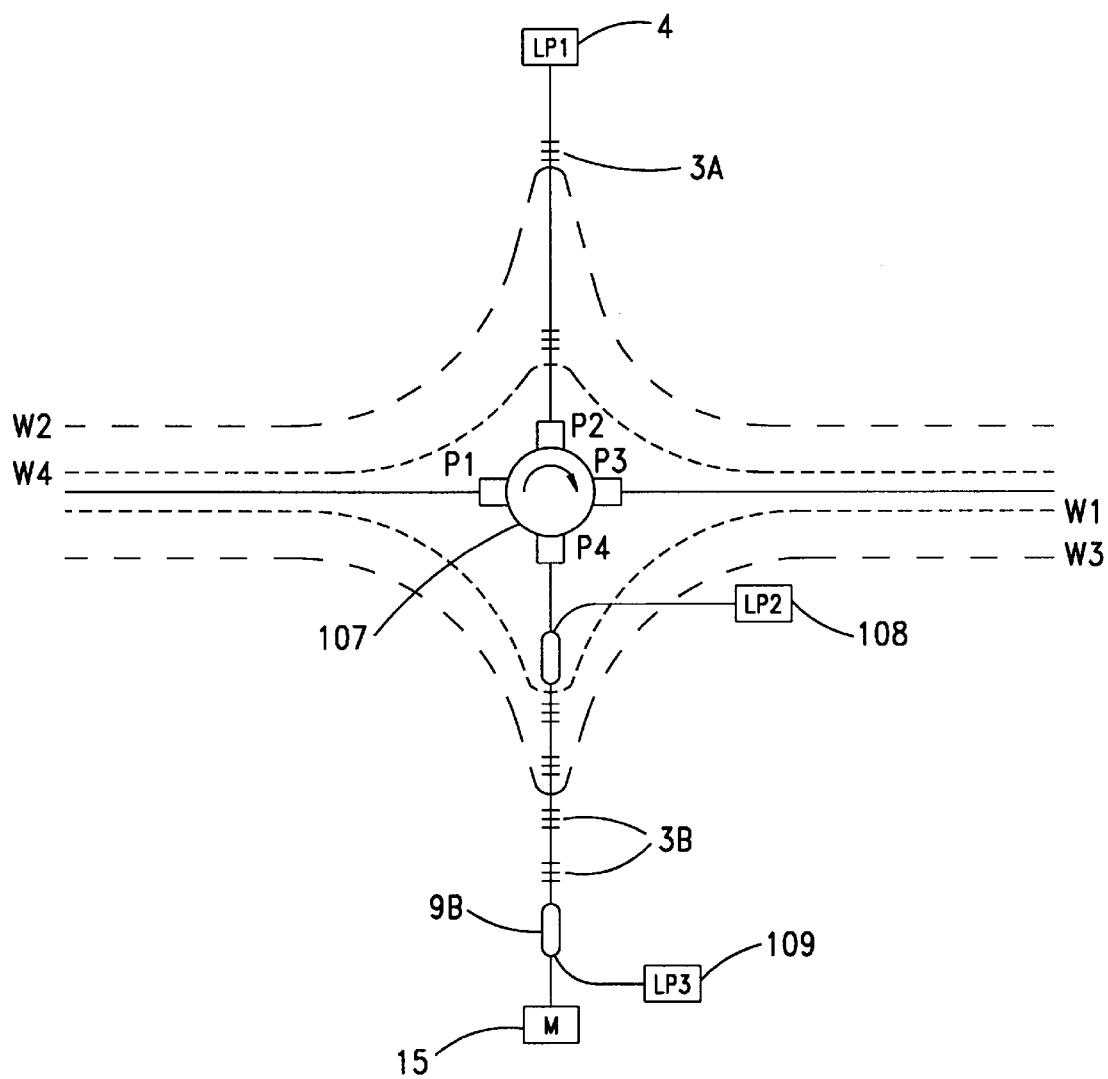
FIG. 4B is a flow diagram showing the light paths of the counter-propagating light beams.
Figure 5:
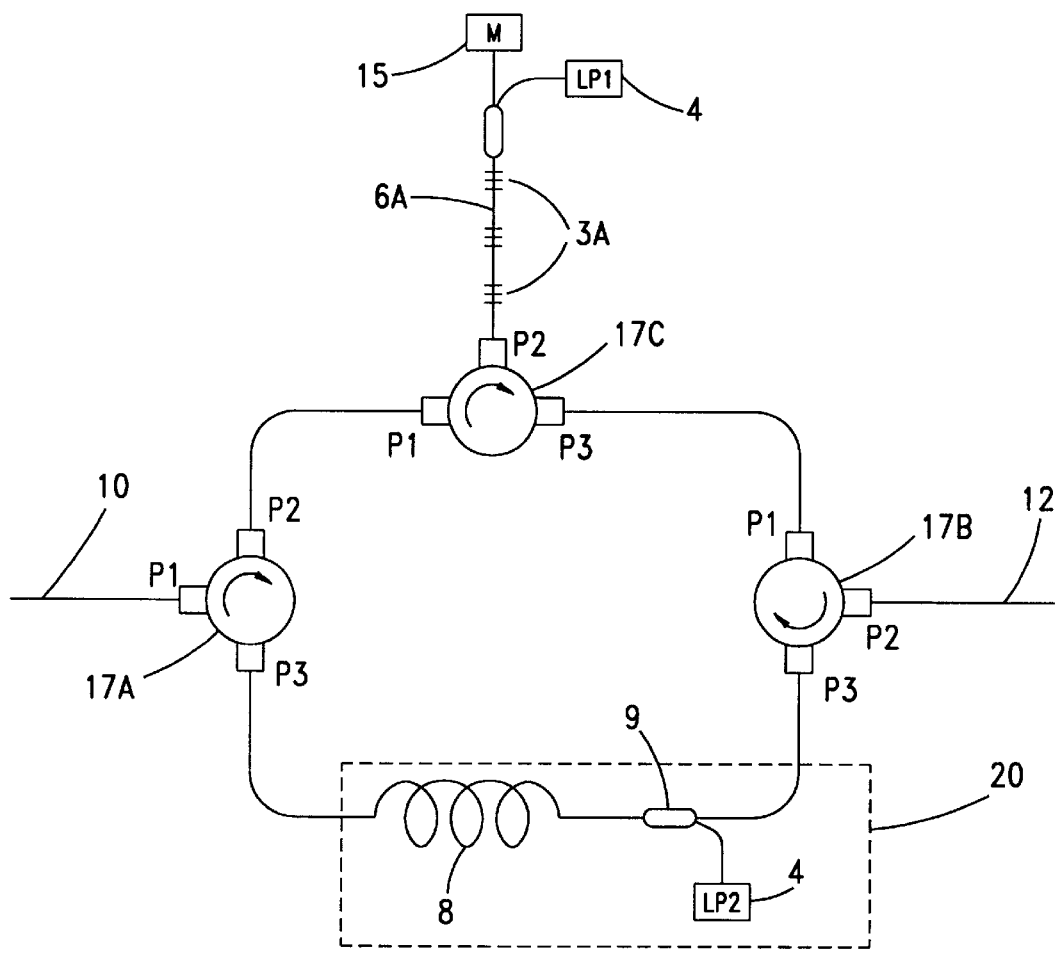
FIG. 5 is a schematic showing a different implementation of the present invention.

Referring to FIG. 4B there is shown in dashed lines the paths of two light beams at wavelengths W1 and W3 propagating in the right to left direction and two other light beams at wavelengths W2 and W4 propagating in the left to right direction Referring to FIG. 5 there is shown an embodiment of the present inventive device utilizing three port circulators 17A, 17B and 17C instead of four port circulators. The light at a first set of wavelengths enters the device through the input fiber 10 to port P1 of circulator 17A and is channeled to port P2 and out to port P1 of the circulator 17C which in turn channels it to the amplifying fiber 6A and gratings 3A from whence it is reflected back to the circulator 17C which channels it to the circulator 17B and out to fiber 12. Light at a second set of wavelengths propagating at the counter direction to the light at the first set of wavelengths enters the device through fiber 12 and is channeled by the circulator 17B to the amplifying assembly 20. The amplifying assembly 20 comprises a wavelength sensitive coupler 9 which couples the input light and the pump light from laser 4 into the amplifying fiber 8. The output of the amplifying fiber 8 goes to the third port P3 of the circulator 17A which channels the light to the fiber 10. The amplifying assembly 20 is a more traditional amplifier assembly and has no gain flattening capability. This embodiment may be useful in cases where flattening is not required for both counter-propagating light waves.

Figure 6A:
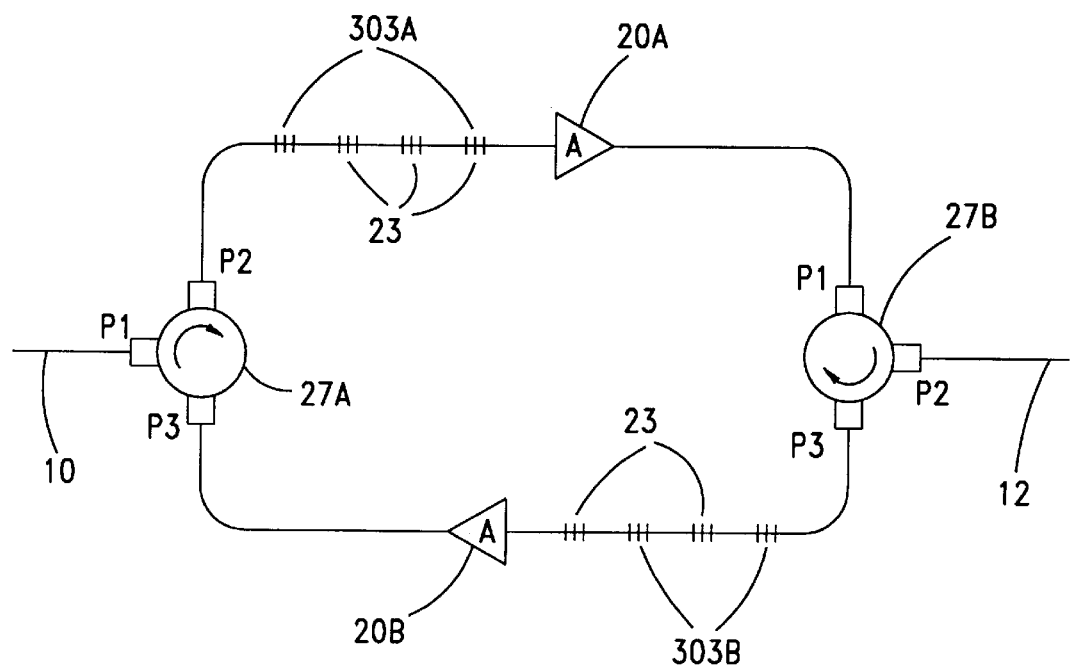
FIG. 6A is a schematic showing a third implementation of the present invention.

Referring to FIG. 6A there is shown yet a different embodiment of the present inventive amplifier with a different arrangement of the gratings 303A and 303B. Light at a first set of wavelengths enters the device through the input fiber 10 and is channeled to a first circulator 27A and through it to the gratings 303A which in this case are designed to pass the first set of wavelengths and reflect at a second set of wavelengths equal to the right to left propagating set of wavelengths. The function of this first set of gratings 303A is to stop any light at the second set of wavelengths scattered back by the input fiber 10 or its continuation into the system transmission fiber. The light at the first set of wavelengths continues through a traditional amplifier 20A to the second circulator 27B and out to fiber 12. Light at a second set of wavelengths propagating in the counter direction to the light at the first set of wavelengths enters the device through fiber 12 and is channeled by the second circulator 27B to the amplifying assembly 20B through the second set of gratings 303B which set is designed to reflect at the first set of wavelengths. The amplifying assembly 20 is a more traditional amplifier assembly and has no gain flattening capability, however an additional set of gratings 23 is added to attenuate individual wavelengths by the appropriate amount so that all wavelengths emerge from the amplifiers 20A or 20B with equal powers.

Figure 6B:
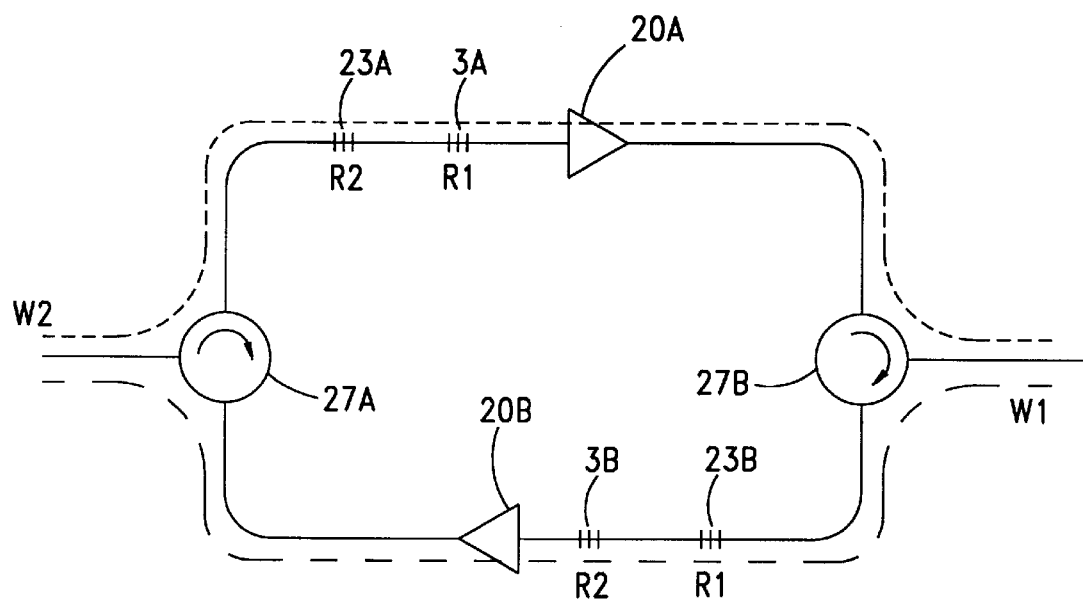
FIG. 6B is a flow diagram showing the light paths of the counter-propagating light beams.

Referring to FIG. 6B there is shown in dashed lines the paths of two light beams at wavelengths W1 and W3 propagating in the right to left direction and two other light beams at wavelengths W2 and W4 propagating in the left to right direction.

Figure 7:
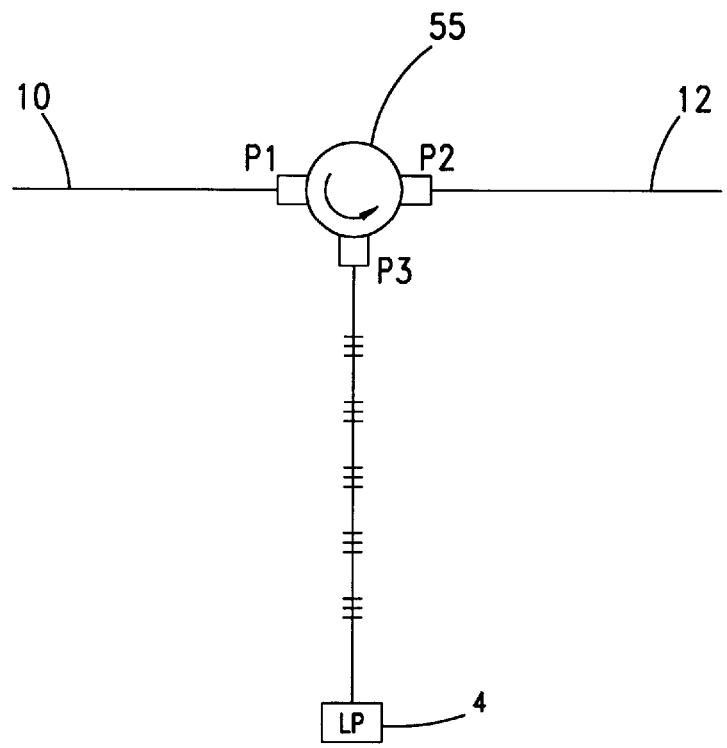
FIG. 7 is a schematic of a rare earth doped fiber amplifier with equal gain at multiple wavelengths.

Referring to FIG. 7 there is shown a schematic of a simpler optical amplifier with equal gain at multiple wavelengths. The amplifier of FIG. 7 is designed for one-directional amplification and comprises an input fiber 10 connected to the first port of a three port circulator 55, an output fiber 12 connected to the third port of the circulator 55, a rare earth doped fiber 6 with a first end connected to the second port of circulator 55 and a second end connected to a pump laser 4, a set of fiber gratings 3 located in the doped fiber 6 at locations selected such that when light at a wavelength Wi propagates through the doped fiber 6, is reflected by the corresponding grating and propagates back to the circulator the light experiences an amplification independent of the wavelength Wi.

While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

What is claimed is:

1. In a fiber communication system having multiple wavelength channels and bidirectional light transmission, a rare earth doped fiber optical amplifier comprising:

a device for channeling light between fibers in an ordered set of fibers, said set of fibers numbering four or more said device for channeling being capable of transferring the light entering from any fiber to exit from the next fiber in the ordered set;

a first fiber acting as input fiber for light at a first set of multiple wavelengths and as output fiber for light at a second set of multiple wavelengths, said fiber being connected to the first of said ordered set of fibers in said channeling means;

a second fiber acting as input fiber for light at said second set of multiple wavelengths and as output fiber for light at said first set of multiple wavelengths, said fiber being connected to the third of said ordered set of fibers in said channeling device;

a first rare earth doped fiber connected to the second of the ordered set of fibers in said channeling device, said doped fiber having a first set of index refraction gratings imprinted in its core region, each grating of said set of gratings reflecting light at one wavelength of said first set of wavelengths with a predetermined reflectivity, each said grating being located within the doped fiber at a predetermined position relative to the end of said doped fiber, said predetermined position being set to cause all said wavelengths in said set of wavelengths to have equal amplification in said doped fiber;

a second rare earth doped fiber connected to the second of the ordered set of fibers in said channeling means, said doped fiber having a first set of index of refraction gratings imprinted in its core region, each grating of said set of gratings reflecting light at one wavelength of said first set of wavelengths with a predetermined reflectivity, each said grating being located within the doped fiber at a predetermined position relative to the end of said doped fiber, said predetermined position being set to cause all said wavelengths in said set of wavelengths to have equal amplification;

a first pump laser connected to said first doped fiber; and a second pump laser connected to said second doped fiber.

2. The apparatus of claim 1 wherein said device channeling light between an ordered set of fibers is a four port circulator.

3. The apparatus of claim 1 wherein said device for channeling light between an ordered set of fibers comprises two four port circulators with each of two consecutive ports of the first circulator being connected to each of two consecutive ports of the second circulator.

4. In a fiber communication system having multiple wavelength channels and bidirectional light transmission, a rare earth doped fiber amplifier comprising:

a device for channeling light between fibers in an ordered set of fibers, said set of fibers numbering four or more said device for channeling being capable of transferring the light entering from any fiber to exit from the next fiber in the ordered set;

a first fiber acting as input fiber for light at a first set of multiple wavelengths and as output fiber for light at a second set of multiple wavelengths, said fiber being connected to the first of said ordered set of fibers in said channeling device;

a second fiber acting as input fiber for light at said second set of multiple wavelengths and as output fiber for light at said first set of multiple wavelengths, said fiber being connected to the third of said ordered set of fibers in said channeling device;

a first rare earth doped fiber connected to the second of the ordered set of fibers in said channeling device, said doped fiber having a first set of index of refraction gratings imprinted in its core region, each grating of said set of gratings reflecting light at one wavelength of said first set of wavelengths with a predetermined reflectivity, each said grating being located within the doped fiber at a predetermined position relative to the end of said doped fiber, said predetermined position being set to cause all said wavelengths in said set of wavelengths to have equal amplification;

a second rare earth doped fiber connected to the second of the ordered set of fibers in said channeling device, said doped fiber having a first set of index of refraction gratings imprinted in its core region, each grating of said set of gratings reflecting light at one wavelength of said first set of wavelengths with a predetermined reflectivity, each said grating being located within the doped fiber at a predetermined position relative to the end of said doped fiber, said predetermined position being set to cause all said wavelengths in said set of wavelengths to have equal amplification;

a first pump laser connected to said first doped fiber; and at least one coupling means capable of coupling the light from at least one additional pump laser with said first set of wavelengths into said second doped fiber.

5. The apparatus of claim 4 wherein said device for channeling light between an ordered set of fibers is a four port circulator.

6. The apparatus of claim 4 wherein said device for channeling light between fibers in an ordered set of fibers comprises two four port circulators with each of two consecutive ports of the first circulator being connected to each of two consecutive ports of the second circulator.

7. In a bidirectional fiber communication system with multiple wavelength channels propagating in a common fiber, an optical amplifier apparatus comprising:

a set of three devices for channeling light between fibers in an ordered set of fibers, said set of fibers numbering three or more, said device for channeling being capable of transferring the light entering from any fiber to exit from the next fiber in the ordered set;

a first fiber acting as input fiber for light at a first set of multiple wavelengths and as output fiber for light at a second set of multiple wavelengths, said fiber being connected to the first of said ordered set of fibers in said channeling device;

a second fiber acting as input fiber for light at said second set of multiple wavelengths and as output fiber for light at said first set of multiple wavelengths, said fiber being connected to the second of said ordered set of fibers in said third channeling device;

a first rare earth doped fiber connected to the second of the ordered set of fibers in said second channeling device, said doped fiber having a first set of index of refraction gratings imprinted in its core region, each grating of said set of gratings reflecting light at one wavelength of said first set of wavelengths with a predetermined reflectivity, each said grating being located within the doped fiber at a predetermined position relative to the end of said doped fiber, said predetermined position being set to cause all said wavelengths in said set of wavelengths to have equal amplification;

a first pump laser connected to said first doped fiber; and an optical amplifier device comprising a coupling means capable of coupling the light from a pump laser with said first set of wavelengths into a second doped fiber, the input of said optical amplifier device being connected to the third port of said third channeling device and the output of said amplifier being connected to the third port of said first channeling means.

8. The apparatus of claim 7 wherein said device for channeling light between an ordered set of fibers is a three port circulator.

9. In a bidirectional fiber communication system with multiple wavelength channels propagating in a common fiber, a bidirectional optical amplifier apparatus comprising:

a first and a second device for channeling light between fibers in an ordered set of fibers, said set of fibers numbering three or more, said device for channeling being capable of channeling the light entering from any fiber to exit from the next fiber in the ordered set;

a first fiber acting as input fiber for light at a first set of multiple wavelengths and as output fiber for light at a second set of multiple wavelengths, said fiber being connected to the first of said ordered set of fibers in said first channeling device;

a second fiber acting as input fiber for light at said second set of multiple wavelengths and as output fiber for light at said first set of multiple wavelengths, said second fiber being connected to the second of said ordered set of fibers in said second channeling device;

a first set of fiber gratings located in the fiber between the second port of the first channeling device and a first optical amplifier device, each grating of said first set having a high reflectivity at a wavelength of said second set of wavelengths, said first optical amplifier having its output connected to the first port of said second channeling device;

a second set of fiber gratings located in the fiber between the second port of the first channeling device and said first amplifier device, each grating of said set having a predetermined reflectivity at a wavelength of said first set of wavelengths, said reflectivity being chosen to cause all wavelengths in said first set of wavelengths to have equal amplification when passing through said first optical amplifier;

a third set of fiber gratings located in the fiber between the third port of the second channeling device and a second optical amplifier device, each grating of said third set having a high reflectivity at a wavelength of said first set of wavelengths, said second optical amplifier device having its output connected to the third port of said first channeling device; and a fourth set of fiber gratings located in the fiber between the third port of the second channeling device and said second amplifier device, each grating of said fourth set having a predetermined reflectivity at a wavelength of said second set of wavelengths, said reflectivity being chosen to cause all wavelengths in said second set of wavelengths to have equal amplification when passing through said second amplifier device.

10. The apparatus of claim 9 wherein said device for channeling light between an ordered set of fibers is a three port circulator.

11. In a fiber communication system having multiple wavelengths propagating in one fiber, an optical amplifier comprising:

a device for channeling light from one fiber to the next fiber in an ordered set of fibers, said set of fibers numbering three or more said means for channeling being capable of transferring the light entering from any fiber to exit from the next fiber in the ordered set;

a rare earth doped fiber having its first end connected to the second port of said channeling device;

a pump laser connected to the first end of said doped fiber; and a set of fiber gratings, one grating for each wavelength in a selected set of wavelengths, said gratings being disposed in the doped fiber at pre-selected positions such that the light propagating through said channeling device and said doped fiber to said gratings and reflected from said gratings back to said channeling device exits the amplifier with an optical amplification independent of the light wavelength.

12. The amplifier of claim 11 wherein the channeling device is a three port circulator.

* * * * *